United States Patent [19]
Schafer et al.

[11] Patent Number: 5,966,434
[45] Date of Patent: Oct. 12, 1999

[54] SYSTEM AND METHOD FOR MANAGING FEATURE INTERACTION OF TELEPHONE SERVICES

[75] Inventors: Craig Loren Schafer, Piscataway; Steven Eric Valin; Timothy Marc Weinrich, both of Somerset; Gregory Michael Fisher, North Brunswick, all of N.J.; Douglas Beck, Colorado Springs, Colo.

[73] Assignee: Telcordia Technologies, Inc., Morristown, N.J.

[21] Appl. No.: 08/829,595

[22] Filed: Mar. 31, 1997

[51] Int. Cl.⁶ .................................................. H04M 3/42
[52] U.S. Cl. ........................ 379/201; 379/220; 379/243
[58] Field of Search .................................. 379/201, 207, 379/220, 230, 242, 243

[56] References Cited

U.S. PATENT DOCUMENTS

| | | | |
|---|---|---|---|
| 5,404,396 | 4/1995 | Brennan | 379/201 |
| 5,448,631 | 9/1995 | Cain | 379/201 |
| 5,455,853 | 10/1995 | Cebulka et al. | 379/207 |
| 5,586,177 | 12/1996 | Farris et al. | 379/207 |

*Primary Examiner*—Ahmad F. Matar
*Attorney, Agent, or Firm*—Joseph Giordano; David A. Hey; Elizabeth A. Mark

[57] ABSTRACT

A service control processor includes a plurality of service feature processors each corresponding to selected telephone service, and a plurality of call processing records, each corresponding to a customer of a service provider. The customer call processing records specify services subscribed to by the caller. A feature manager processor manages call processing and the implementation and execution of services by managing the individual service feature processors. In an alternative embodiment, multiple feature manager processors are included, and a trigger manager selects between them in response to call processing triggers.

10 Claims, 3 Drawing Sheets

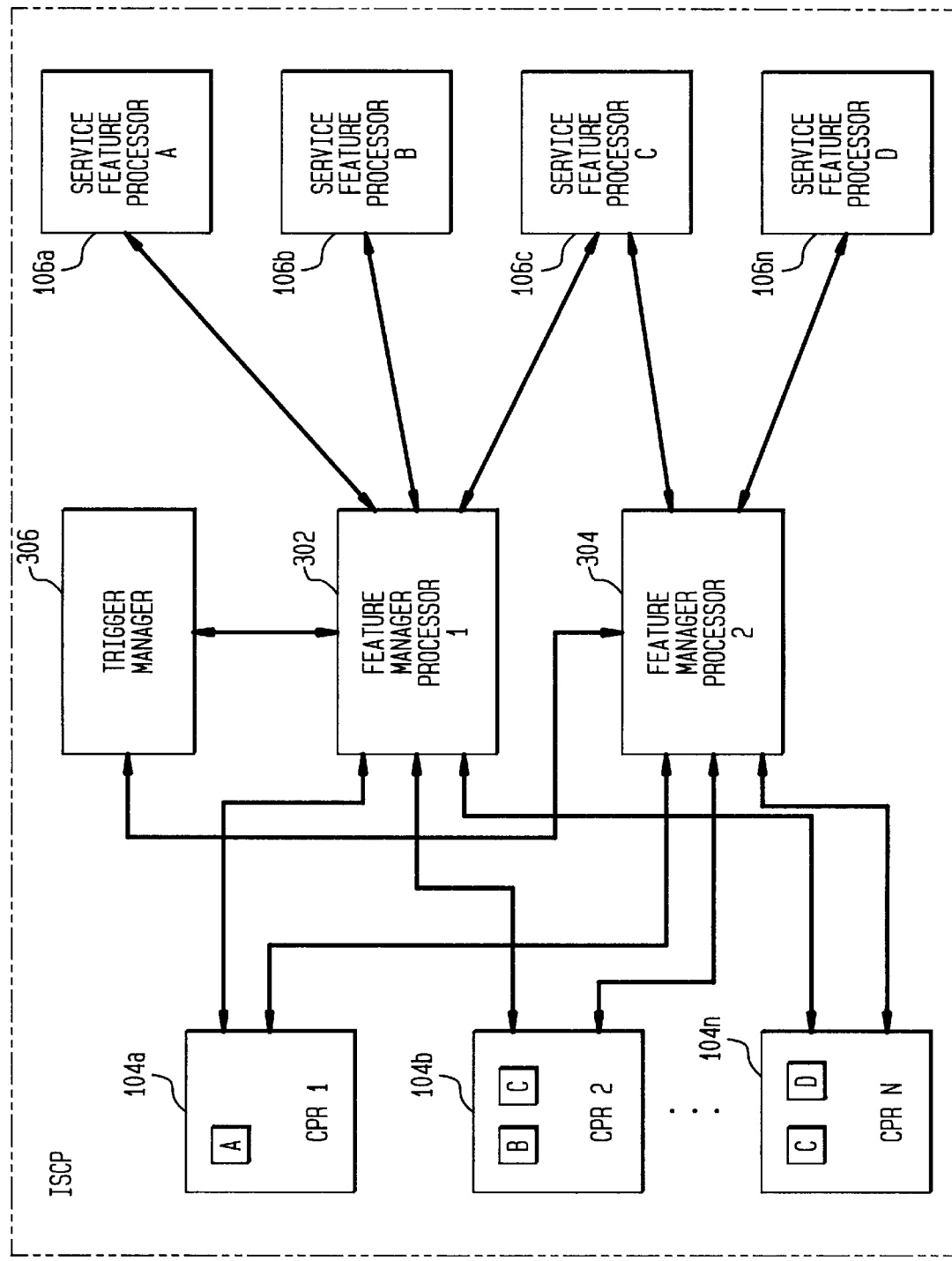

SYSTEM AND METHOD FOR MANAGING FEATURE INTERACTION OF TELEPHONE SERVICES

FIELD OF THE INVENTION

The present invention relates to the field of service management in a telephone network, and in particular to managing service features in a service control point.

BACKGROUND OF THE INVENTION

Bellcore has developed the SPACE® and MSAP (multiservice application platform) applications to permit the development and instantiation of telephone services in the advanced intelligent network ("AIN"). Multiple service providers utilize the SPACE and MSAP languages. In general, call processing records corresponding to each customer are generated by a service provider and stored in a database associated with a service control point ("SCP") in a telephone network. Calls to or from a customer trigger execution of the call processing records to provide the subscribed-to services for each customer. Prior to this invention, the system was oriented toward a single service per trigger execution, using predetermined service components. Adding a new feature to an existing service involved changing the service itself.

Accordingly, it is an object of the invention to improve call processing applications and to improve the efficiency and effectiveness of call processing procedures.

DESCRIPTION OF THE INVENTION

To achieve these and other advantages and in accordance with the purposes of the invention, as embodied and broadly described, the invention includes a service control point for a telephone network, including a plurality of service feature processors, each service feature processor including means for executing a predetermined set of instructions to implement a predetermined telephone service, and a plurality of customer call processing records, each call processing record including data corresponding to one or more service features in each customer's service portfolio, a feature manager processor including means responsive to one or more trigger messages for selecting one or more service feature processors dynamically to implement each customer's service portfolio.

The invention further includes, in a SCP including customer call processing records and a plurality of service feature processors, a method of implementing one or more of a plurality of service features, including the steps of identifying which service features a particular customer subscribes to and dynamically executing each of the identified service features.

It is to be understood that both the foregoing general description and the following detailed description are exemplary and explanatory and are intended to provide further explanation of the invention as claimed.

BRIEF DESCRIPTION OF THE DRAWINGS

FIG. 3 illustrates a block diagram of an ISCP in accordance with an alternative embodiment of the present invention.

BEST MODE FOR CARRYING OUT THE INVENTION

Reference will now be made in detail to the construction and operation of preferred implementations of the present invention which are illustrated in the accompanying drawings.

The following description of the preferred implementations of the present invention is only exemplary of the invention. The present invention is not limited to these implementations, but may be realized by other implementations.

Figure 1:
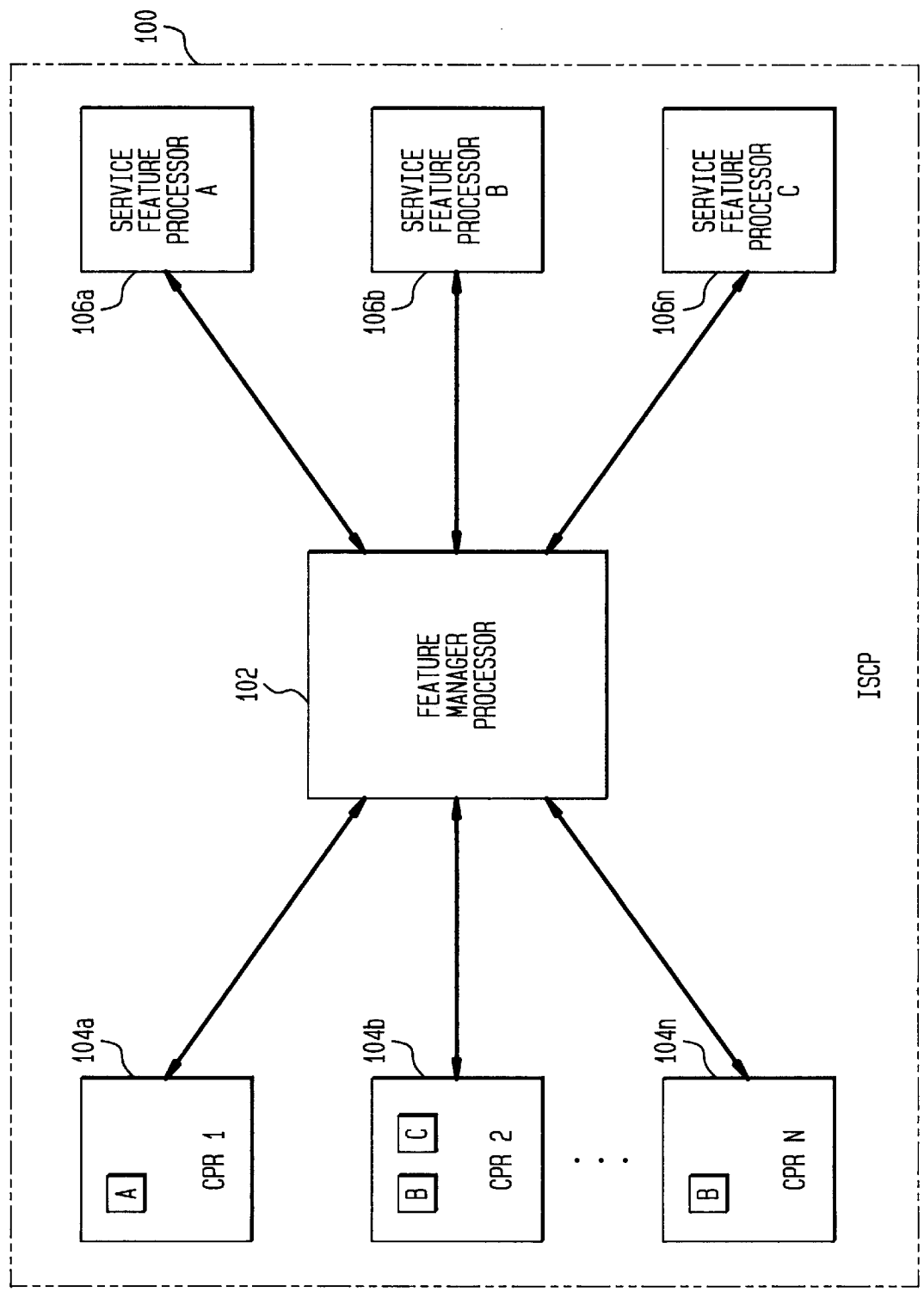
FIG. 1 illustrates a block diagram of an ISCP with a feature manager processor in accordance with one embodiment of the present invention.

FIG. 1 illustrates a block diagram of an ISCP with a feature manager processor in accordance with one embodiment of the present invention.

ISCP 100 includes feature manager processor 102, a plurality of call processing records 104a–104n, and a plurality of service features processors 106a–106n. In accordance with the present invention, service feature processors 106 provide specific call processing for predetermined telephone services. For example, service feature processor A 106a may correspond to a call forward feature, service feature processor B 106b may correspond to a call blocking feature, and service feature processor C 106n may correspond to a distinctive ring feature. Service feature processors 106 preferably comprise software applications developed using the Bellcore SPACE® language as described, for example, in Bellcore Document No. BR 780-003-186.

Call processing records ("CPRs") 104 correspond to each individual service customer. The CPRs 104 preferably identify the services each customer subscribes to and includes the data necessary to execute each service. For example, CPR 1 104a corresponds to a first customer who subscribes to service A. Accordingly, CPR 1 includes data A that is used by the service feature processor A 106a to execute that service for the customer. A customer who subscribes to services B and C would have a CPR such as CPR 2 104b which includes data B and C used by service feature processor B 106b and service feature processor C 106n to execute those services. The configuration of such call processing records is described, for example, in Bellcore Document No. BR 780-003-186.

In accordance with the present invention, feature manager processor 102 communicates with each CPR 104 and each service feature processor 106 to manage the processes provided by a service provider. Feature manager processor 102 controls the manner in which services are executed (if at all) for each customer. Feature manager processor 102 manages multiple features on a single line and manages the interaction of these features. A service provider can program a feature manager processor 102 to manage a portfolio of services provided by that service provider. Thus, call processing is provided by the service feature processors 106 using data from the customer's CPRs 104 under the control of a feature manager processor 102.

Generally, to process a call to or from a subscriber, feature manager processor 102 makes decisions about whether a customer subscribes to certain features and requests execution of those service features by the corresponding service feature processors 106 depending on whether the customer subscribes to the service. Feature manager processor 102 also makes decisions based on the results provided by service feature processors 106. This configuration allows service creators the flexibility to modulize features and functions.

In accordance with the present invention, feature manager processor 102 may comprise any hardware processor and corresponding application necessary to implement the functionality described herein. Preferably, feature manager processor 102 includes the Bellcore application implemented using the Bellcore SPACE software, as described in Bellcore Document No. BR 780-003-186.

Figure 2:
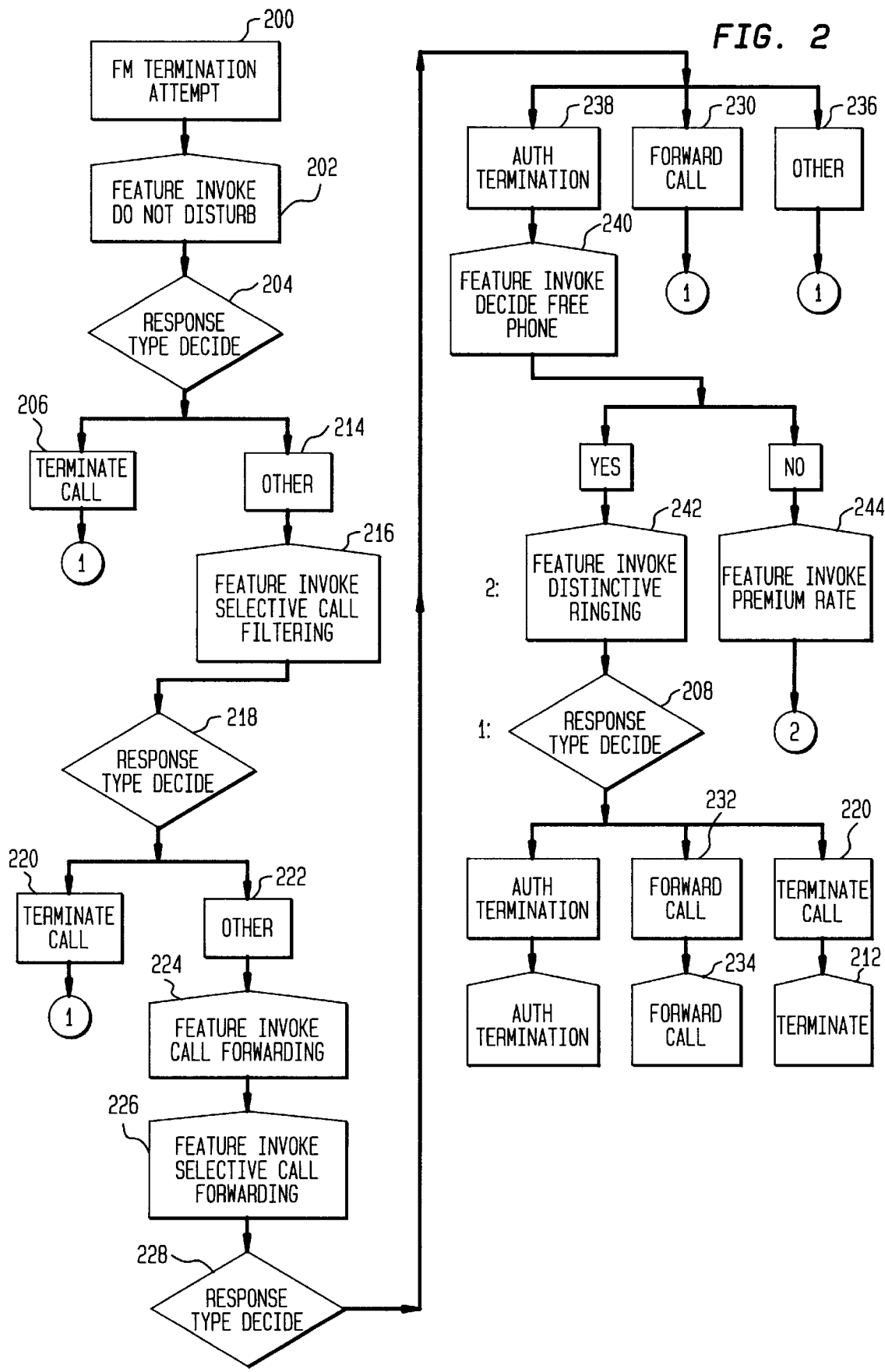
FIG. 2 includes flow processing of a feature manager processor that manages seven service features: "do not disturb," "selective call filtering," "call forwarding," "selective call forwarding," "free phone," "distinctive ringing," and "premium rate" services, in accordance with one embodiment of the invention.

To help illustrate the functionality of a feature manager processor 102, FIG. 2 includes flow processing of a feature manager processor that manages seven service features: "do not disturb," "selective call filtering," "call forwarding," selective call forwarding," "free phone," "distinctive ringing," and "premium rate" services. To manage these services, a service provider programs the feature manager processor 102 to execute these services as provided, for example, in FIG. 2. Thus, each call directed to any of the customers corresponding to CPRs 104 would be processed according to the processing flow of FIG. 2.

Initially, feature manager processor 102 responds to a termination attempt (step 200). The termination attempt is a trigger corresponding to a called telephone number of a customer. In response, feature manager processor 102 initially performs a "feature invoke" operation for the "do not disturb" feature (step 202). The "feature invoke" operation initially determines whether the customer subscribes to that service. Feature manager processor 102 preferably does so by reviewing the data in the CPR corresponding to the dialed telephone number. If the customer subscribes to the "do not disturb" feature, feature manager processor 102 hands over the processing to the service feature processor 106 corresponding to the "do not disturb" feature.

The corresponding service feature processor 106 performs the corresponding call processing and returns an instruction to the feature manager processor 102, which uses the information from the service feature processor 106 to further control processing (step 204). For example, for the "do not disturb" feature, the service feature processor 106 may have determined that the customer being called does not wish to receive calls after 9:00 p.m. If the phone call is being made at 10:00 p.m., the service feature processor 106 will return a "terminate call" message to the feature manager processor 102 (step 206). The processing then preferably jumps to the corresponding call processing to terminate the call (steps 208–212).

If the customer does not subscribe to the "do not disturb" feature, the feature manager process 102 simply continues processing to step 214.

If the "do not disturb" service feature processor returns any message other than terminate call (step 214) or the feature did not execute, then the feature manager processor 104 invokes the next feature, "selective call filtering" (step 216). The "selective call filtering" feature may be used to block a call from a particular party. Here again, feature manager processor 102 initially determines whether the customer subscribes to a "selective call filtering" feature. If so, feature manager processor 102 hands over processing to the corresponding service feature processor 106. If not, feature manager processor 102 continues.

Feature manager processor 102 then awaits the results of the processing by the service feature processor 106 and uses the information returned by that service feature processor 106 to determine further processing (step 218). For example, if the service feature processor 106 returns the instruction to terminate the call (step 220), feature manager processor 102 jumps to the processing necessary to terminate the call (steps 208–212). For any other instruction (step 222), feature manager processor 102 continues. In this example, feature manager processor 102 next determines whether the customer subscribes to a "call forwarding" service and hands over processing to the corresponding service feature processor 106 if the customer does so subscribe (step 224). If the customer does not subscribe to a "call forwarding" feature, feature manager processor 102 continues to step 226.

In the example shown in FIG. 2, the feature invoke 224 and the subsequent feature invoke "selective call forwarding" service (step 226) provides for overriding feature invocation. For example, the "call forwarding" service may route calls to the customer's home phone during certain times of day and to a business phone during other times of the day. The "selective call forwarding" feature may provide a specific list of parties that will be forwarded to the customer's cellular phone. Feature manager processor 102 invokes both of these features before deciding on further call processing (step 228). Since "selective call forwarding" (step 226) may execute immediately following the "call forwarding" feature without confirming the results of the "call forward" feature, any call state changes affected by the "selective call forwarding" feature override those of the "call forward" feature. This overriding mechanism is used in this example to "specialize" the behavior of one feature with another. For example, if a customer has requested that phone calls be routed to the home phone during certain times of day, the call state will be set to "forward call" and the called party will be routed to the customer's home phone. However, if the subsequent "selective call forward" feature determines that the particular caller should be routed to the customer's cellular phone, the call state will be changed appropriately thus overriding the action requested by the prior feature.

Feature manager processor 102 then makes a decision to continue processing based on the information returned from the two service feature processors 106 corresponding to the "call forwarding" and "selective call forwarding" features. For example, if the instruction "forward call" (step 230) or any other message other than "auth-termination" (step 236), the feature manager processor jumps to the steps necessary to complete to the call (steps 208, 232, and 234).

The authorized termination state (step 238) corresponds to a caller who has made it through the "do not disturb" and "selective call" filtering features without being blocked and has proceeded through the "call forwarding" and "selective call forwarding" features without being forwarded. For these callers, feature manager processor 102 then decides whether the customer subscribes to a "free phone" service (step 240). Feature invoke decide node allows the premium rate feature to be invoked if the free phone feature was not executed. This differs from the feature invoke node for which execution proceeds indiscriminately to the following node.

If in step 240, feature manager processor 102 determines that the customer does not subscribe to a "free phone" service, feature manager processor 102 then determines whether the customer subscribes for a "premium rate" service. In this manner only one of these two features may be executed. The premium rate service charges a premium to any caller calling the customer, similarly to a 900 telephone number (step 244).

Lastly, the feature manager processor 102 uses a feature invoke "distinctive ringing" step (step 242) to determine whether the customer desires distinctive ringing for incoming calls. At step 208, the feature manager processor 102 examines the final state of the call and routes or terminates the current call as needed.

FIG. 3 illustrates an ISCP configuration in accordance with an alternative embodiment of the present invention. In this embodiment, an ISCP includes multiple feature manager processors 302 and 304 and a trigger manager 306, as well as call processing records 104a–104n and service feature processors 106a–106n. In this embodiment, each feature manager processor 302 and 304 manages a selected number of service feature processors 106. For example, feature manager processor 1 302 manages service feature processors A 106a, B 106b, and C 106c, while feature manager processor 2 304 manages service feature processors C 106c and D 106n. Trigger manager 306 is included to determine which feature manager processor to invoke to control the call processing. For example, feature manager processor 1 302 may be dedicated to all services that trigger on a dialed telephone number, while feature manager processor 2 304 may be dedicated to manage all features corresponding to a calling number. In response to a called telephone number, trigger manager 306 would select feature manager processor 1 302 to perform call processing. In response to a call from a customer, trigger manager 306 would select feature manager processor 2 304 to continue call processing.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

We claim:

1. A service control point for a telephone network, comprising:

a plurality of service feature processors that execute sets of instructions for implementing predetermined telephone services, each of the service feature processors implementing a different one of the telephone services;

a plurality of call processing records that store data for a corresponding plurality of customers, each of the call processing records identifying at least one of the telephone services subscribed to by the corresponding customer; and a feature manager, connected to the service feature processors and the call processing records, that determines an identity of the telephone services for a particular one of the customers from a corresponding one of the call processing records and invokes the corresponding service feature processors to implement the identified telephone services in response to a trigger signal.

2. The service control point of claim 1, wherein the call processing records further store information necessary to execute each of the telephone services.

3. The service control point of claim 1, wherein the feature manager includes a plurality of feature manager processors connected to different subsets of the service feature processors, each of the feature manager processors managing the connected subset of service feature processors.

4. The service control point of claim 3, further comprising:

a trigger manager, connected to the feature manager processors, that selects one of the feature manager processors based on a type of the trigger signal.

5. The service control point of claim 1, wherein the feature manager includes:

means for determining an order for invoking the service feature processors, and means for invoking the service feature processors in the determined order.

6. In a service control point for a telephone network that includes a plurality of service feature processors that execute sets of instructions for implementing predetermined telephone services, a plurality of call processing records that identify at least one of the telephone services subscribed to by corresponding customers, and a feature manager, a method of implementing telephone services for a customer, comprising the steps, executed by the feature manager, of:

determining an identity of the telephone services for a particular one of the customers from a corresponding one of the call processing records; and invoking the corresponding service feature processors to implement the identified telephone services in response to a trigger signal.

7. The method of claim 6, wherein the invoking step includes the substeps of:

determining an order for invoking the service feature processors, and invoking the service feature processors in the determined order.

8. A service control point for a telephone network, comprising:

a plurality of service feature processors that execute sets of instructions for implementing predetermined telephone services, each of the service feature processors implementing a different one of the telephone services;

a plurality of call processing records that store data for a corresponding plurality of customers, each of the call processing records identifying at least one of the telephone services subscribed to by the corresponding customer;

a plurality of feature managers, connected to different subsets of the service feature processors and to all of the call processing records, that determine an identity of the telephone services for a particular one of the customers from a corresponding one of the call processing records and invoke the corresponding service feature processors to implement the identified telephone services in response to a trigger signal; and a trigger manager, connected to the feature managers, that selects one of the feature manager processors based on a type of the trigger signal.

9. The service control point of claim 8, wherein the call processing records further store information necessary to execute each of the telephone services.

10. The service control point of claim 8, wherein each of the feature managers includes:

means for determining an order for invoking the service feature processors, and means for invoking the service feature processors in the determined order.

\* \* \* \* \*